(12) United States Patent
Scherrer et al.

(10) Patent No.: US 10,623,190 B2
(45) Date of Patent: Apr. 14, 2020

(54) MEDIATED ANONYMITY FOR PERMISSIONED, DISTRIBUTED-LEDGER NETWORKS

(71) Applicant: SAP SE, Walldorf (DE)

(72) Inventors: Arne Scherrer, Kleinmachnow (DE); Mathias Held, Potsdam (DE); Dennis Kuhnert, Berlin (DE)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 15/974,180

(22) Filed: May 8, 2018

(65) Prior Publication Data

US 2019/0349203 A1 Nov. 14, 2019

(51) Int. Cl.
| | |
|---|---|
| H04L 29/06 | (2006.01) |
| H04L 9/32 | (2006.01) |
| H04L 9/30 | (2006.01) |
| H04L 29/08 | (2006.01) |
| G06Q 20/38 | (2012.01) |

(52) U.S. Cl.
CPC ............ *H04L 9/3247* (2013.01); *H04L 9/30* (2013.01); *H04L 9/3242* (2013.01); *H04L 63/0421* (2013.01); *G06Q 20/3829* (2013.01); *G06Q 2220/00* (2013.01); *H04L 67/28* (2013.01); *H04L 2209/38* (2013.01)

(58) Field of Classification Search
None
See application file for complete search history.

(56) References Cited

U.S. PATENT DOCUMENTS

2016/0224951 A1* 8/2016 Hoffberg .............. G06Q 20/401

OTHER PUBLICATIONS

Hardjono, Thomas, et al., "Anonymous Identities for Permissioned Blockchains", 2016, pp. 1-20 (Year: 2016).*
Hardjono, Thomas, et al., "Anonymous Identities for Permissioned Blockchains", 2016, pp. 1-20.

* cited by examiner

*Primary Examiner* — Andrew J Steinle
(74) *Attorney, Agent, or Firm* — Mintz Levin Cohn Ferris Glovsky and Popeo, P.C.

(57) ABSTRACT

Techniques are described for anonymity in private-permissioned, distributed ledger networks. A transaction application is implemented by a mediating member of a private-permissioned, distributed ledger network. The mediating member may utilize the transaction application to execute network transactions with respect to the distributed ledger network. In the network transactions, a surrogate member implements or otherwise facilitates the network transaction on behalf of, or with respect to, a participant, in the context of a plurality of related network transactions being mediated by the mediating member for a plurality of participants. In this way, the mediation may be conducted anonymously, while still utilizing the features of the private-permissioned, distributed ledger network.

20 Claims, 7 Drawing Sheets

200

202 — Generate a mediated transaction instance of a transaction application, at a mediating member of a set of members of a distributed ledger network for which the set of members have corresponding member identities, wherein write access to the distributed ledger network is restricted by a write access policy requiring a writing member identity of the member identities to be shared in conjunction with a write event by a writing member 204 — Generate, for the mediated transaction instance, an instance identity private key that is provided to a participant of the mediated transaction instance 206 — Register an instance identity public key corresponding to the instance identity private key with the distributed ledger network, using the mediating member identity of the mediating member in accordance with the write access policy 208 — Receive, via the distributed ledger network, a transaction payload from the participant for the mediated transaction instance, the transaction payload being registered on the distributed ledger network for the mediated transaction instance by a surrogate member of the set of members on behalf of the participant, using a surrogate member identity of the surrogate member and in accordance with the write access policy, wherein the transaction payload is signed using the instance identity private key, and the surrogate member authenticates the signed transaction payload against the registered instance identity public key before registering the signed transaction payload on the distributed ledger network

FIG.2

MEDIATED ANONYMITY FOR PERMISSIONED, DISTRIBUTED-LEDGER NETWORKS

TECHNICAL FIELD

This description relates to distributed-ledger computer networks.

BACKGROUND

Distributed-ledger computer networks generally refer to various types of decentralized, peer-to-peer networks in which multiple computers, or nodes, store transactional data in a verifiable, tamper-proof manner. Distributed-ledger networks use various cryptographic techniques to submit and store data. The submitted, stored data can be verified, based on agreed-upon algorithms and a consensus of validity among the participating nodes.

In such networks, data storage is robust, inexpensive, and efficient. Further, such networks provide technology that enables many different types of transactions, including, e.g., offers for sale, payments, contracts, digital currency, record-keeping (e.g., property titles or birth certificates), and audits.

In some implementations of such networks, e.g., private permissioned distributed-ledger networks, each member or participant of a group or consortium of participants shares its identity with the other members, in conjunction with enforcing write access restrictions. For example, the identity of a single network participant may be revealed upon write access to the shared ledger, to thereby enforce write restrictions. For example, a participant may be required to share its unique identifier when storing an entry, e.g., a transaction, on the ledger.

On the other hand, some types or aspects of ledger transactions are desired to be at least partially anonymous. For example, some participants may wish to submit one or more entries to be evaluated or reviewed by at least one other network member, where only the reviewing member(s) has knowledge of the submitters' identities. However, such scenarios conflict with the types of write access restrictions referenced above.

BRIEF DESCRIPTION OF THE DRAWINGS

FIG. 2 is a flowchart illustrating example implementations of the system of FIG. 1.

DETAILED DESCRIPTION

Figure 1:
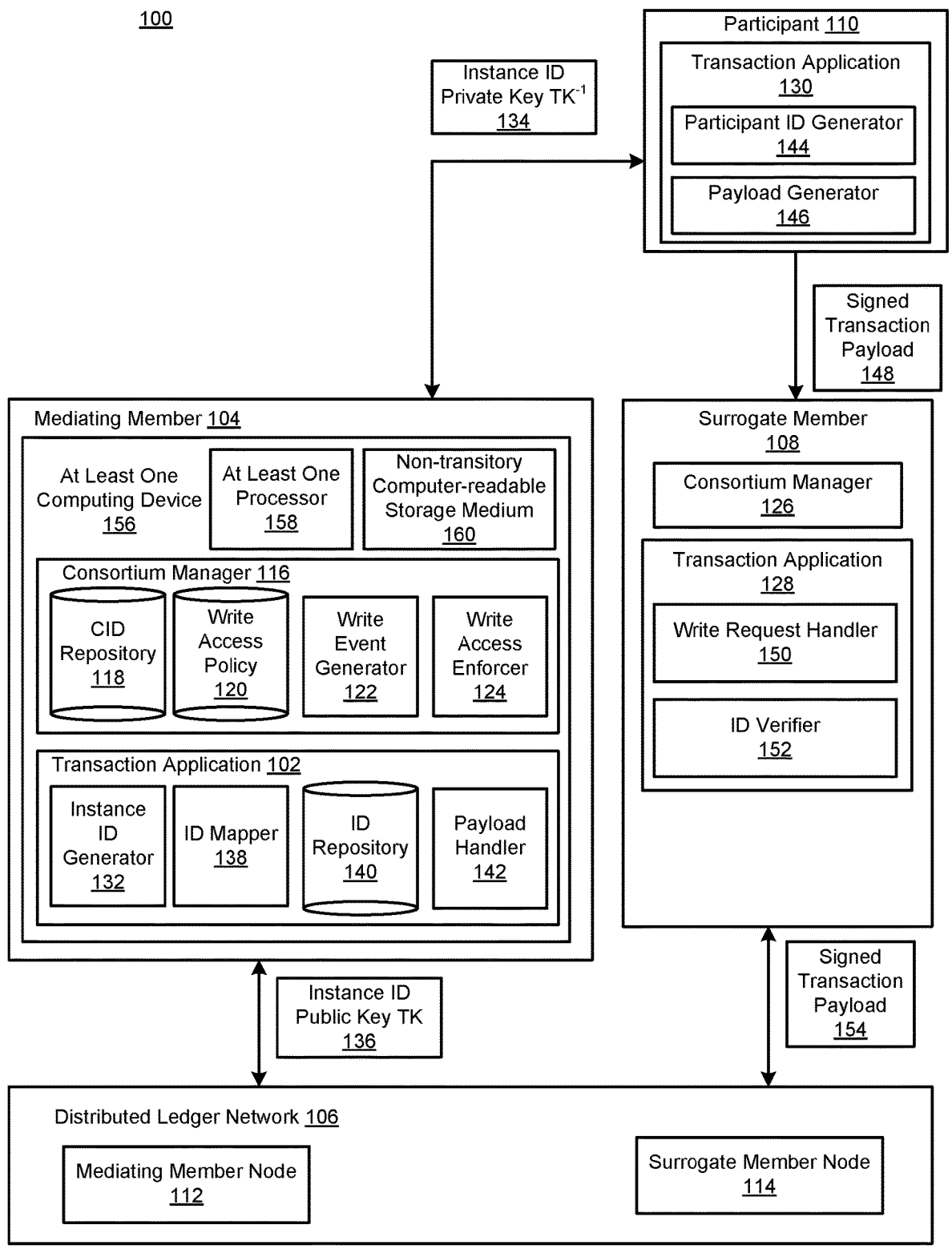
FIG. 1 is a block diagram of a system for anonymity in private permissioned, distributed-ledger networks.

FIG. 1 is a block diagram of a system 100 for anonymity in private-permissioned, distributed ledger networks. In the example of FIG. 1, a transaction application 102 is implemented by a mediating member 104 of a private-permissioned, distributed ledger network 106. As described in detail below, the mediating member 104 may utilize the transaction application 102 to execute network transactions with respect to the distributed ledger network 106. In the network transactions, a surrogate member 108 implements or otherwise facilitates the network transaction on behalf of, or with respect to, a participant 110, in the context of a plurality of related network transactions being mediated by the mediating member 104.

The distributed ledger network 106 represents one or more known or future types of decentralized, distributed, and/or peer-to-peer network in which digital data is stored, maintained, and accessed. As shown, the distributed ledger network 106 thus includes a network node corresponding to each member of the distributed ledger network 106, illustrated in FIG. 1 as a mediating member node 112 and a surrogate member node 114. As is generally known, data records stored using the distributed ledger network 106 may thus be duplicated, synchronized, and shared across geographically diverse members, each of which has an ability to independently construct and store desired data records.

In example implementations, the distributed ledger network 106 may be implemented using blockchain technology, in which network transactions are bundled into conjoined or chained sequences that are then broadcast or otherwise replicated to all member nodes. However, although blockchain is referenced herein with respect to specific example implementations, it will be appreciated that other known or future types of distributed ledger technology may be additionally or alternatively used.

It is possible to implement part or all of a distributed ledger network in a public manner, in which any general member of the public with network access may read from, or write to, a node of the network. In the example of FIG. 1, however, as referenced above, the distributed ledger network 106 represents a private-permissioned distributed ledger network, in which only a defined group or set of members is authorized to write network transactions thereon. In this regard, therefore, it will be appreciated that the distributed ledger network 106 may be understood to represent an entirety of network nodes used to implement the private-permissioned distributed ledger network. In other examples, the distributed ledger network 106 may represent a subset of a larger distributed ledger network, or other distributed network, in which a subset of the nodes correspond to the authorized members having write access permission.

In many of the following examples, the group or set of members participating in the private-permissioned distributed ledger network 106, including the mediating member 104 and the surrogate member 108, are described as forming a consortium. In such examples, the term "member" may be used interchangeably with the term "consortium member."

Thus, in the example of FIG. 1, the mediating member 104 is illustrated as including a consortium manager 116, representing software and associated hardware configured to define/identify the referenced consortium of members, and to enforce write restrictions and write access with respect to the distributed ledger network 106. As shown, the consortium manager 116 includes a consortium identifier (CID) repository 118, in which unique identifiers for each consortium member are stored.

Further, the consortium manager 116 includes a stored write access policy 120, representing a trust model that is agreed to by all members of the consortium. The write access policy 120 may be used, for example, to enforce write restrictions, and otherwise validate write access events, with respect to any individual consortium member wishing to write data to the distributed ledger network 106.

Thus, in practice, a write event generator 122 is configured to access, and otherwise interact with, the mediating member node 112 of the distributed ledger network 106, whenever the mediating member 104 seeks to store data using (or otherwise write to) the distributed ledger network 106. In conjunction with any such write event that may be generated by the write event generator 122, a write access enforcer 124 is configured to consult the write access policy 120 and the CID repository 118, in order to verify and validate an authority and validity of the requested write event.

More particularly, as referenced, the distributed ledger network 106 does not require a centralized authority to store or disburse data within and among the various nodes of the distributed ledger network 106. Instead, for example, the write access policy 120 may specify requirements for a consensus of verification and validity among some or all members of the consortium, with respect to any particular write event.

In general, many known or future techniques may be used to construct and enforce the write access policy 120 and the corresponding write access enforcer 124. For example, a designated number or percentage of the consortium members may be required to authorize the requested write event, before validating the corresponding data for storage using the distributed ledger network 106. Further details regarding operations of the consortium manager 116 in this regard are therefore not described further in detail herein, except as may be necessary or helpful in understanding operations of the system 100.

Since the write access policy 120 generally requires a consensus or other type of agreement among members of the consortium, each such member will generally implement a corresponding version of the consortium manager 116, illustrated in FIG. 1 by the example of a consortium manager 126 implemented at the surrogate member 108. In other words, it will be appreciated that the consortium manager 126 may include some or all of the various elements/modules 118-124 of the consortium manager 116, and may interact with the consortium manager 116 in order to provide and enforce write access with respect to the mediating member 104, the surrogate member 108, and/or any other member of the consortium identified within the CID repository 118 as having write access with respect to the private-permissioned distributed ledger network 106.

In some implementations, the members 104, 108 may represent businesses or other organizations, in which corresponding nodes 112, 114 are unique with respect to the respective organizations. In such scenarios, of course, authorized individuals within each such organization will have access to read and/or write with respect to his or her corresponding member node, and in accordance with the write access policy 120.

In FIG. 1, the nodes 112, 114 are illustrated within the distributed ledger network 106 as being separate from the corresponding members 104, 108. In this way, FIG. 1 conceptually illustrates that the distributed ledger network 106 is shared by all members, although each member node is unique to its corresponding member. In practice, each member node may be implemented at a physical location of its corresponding member, and may be in communication with other member nodes using an appropriate public or private network, such as the public internet.

Further, in the simplified example of FIG. 1, only the mediating member 104 and the surrogate member 108 are illustrated as being members of the consortium identified within the CID repository 118. Of course, in practice, a consortium of members implementing the private-permissioned distributed ledger network 106 may include any suitable or desired number of members, as long as all such members are specified and authorized as described herein with respect to operations of the consortium managers 116, 126.

The structure of the system 100 of FIG. 1 thus enables all consortium members to write to the distributed ledger network 106, in a manner that conforms to the trust model of the write access policy 120. Consequently, when viewing data on the distributed ledger network 106, all consortium members may identify the consortium member authoring the data, and trust that the authoring member was authorized to write the authored data to the distributed ledger network 106.

In some types of network transactions, however, varying degrees and types of anonymity may be required or desired. As may be appreciated from the above description, such anonymity may thus conflict with the types of features and advantages of the private-permissioned distributed ledger network 106, just described. As detailed below, the transaction application 102 of the mediating member 104 enables various types and degrees of anonymity in the use of the distributed ledger network 106, while still providing many or all of the desirable aspects of the consortium network model described above.

For example, it may occur that the mediating member 104 utilizes the transaction application 102 to mediate one or more network transactions in which the mediating member 104 interacts with a plurality of transaction participants (represented by the participant 110), in which identities of the various participants are known to the mediating member 104, but obscured or anonymous with respect to one another, and/or with respect to other consortium members.

In other words, in the context of the private-permissioned distributed ledger network 106, an identity of a submitting third-party participant, such as the participant 110, is obfuscated from all consortium members of the private-permissioned distributed ledger network 106, except for the mediating member 104. In such scenarios, since the mediating member 104 has identity knowledge of all the participants in the mediated network transaction, the mediating member 104 has sole authority to consummate or otherwise manage the mediated network transaction.

Further, such mediated network transactions may be executed uniquely with respect to a specific transaction instance, e.g., with respect to a transaction instance of the transaction application 102. In this way, the desired network transaction may be initiated, conducted, and completed, without ever publicly revealing identities of the various participants in the network transaction. Further, such network transaction instances may be executed independently of one another, including in parallel with one another, and all with the advantages and features of the consortium-based structure described herein.

In more detail, and as described further below, the surrogate member 108 operates as a surrogate for, or on behalf of, the participant 110, and thereby facilitates an anonymity of the participant 110 with respect to the mediated network transaction. Specifically, as shown, the surrogate member 108 includes a transaction application 128, while the participant 110 implements a transaction application 130. The transaction applications 102, 128, 130 thus provide an application layer on top of the network layer of the distributed ledger network 106, which preserves the anonymity of the participant 110 with respect to the specific, corresponding instance of the network transaction being conducted, while maintaining and utilizing advantageous features of the underlying distributed ledger network 106.

In order to implement the instance-specific application layer just referenced, the transaction application 102 includes an instance identifier (ID) generator 132. As shown, the instance ID generator 132 is configured to generate an instance ID private key 134, notated herein in as $TK^-$, which is provided to the participant 110 in a secure, confidential manner. The instance ID generator 132 also generates a corresponding instance ID public key 136, notated herein as TK, which is propagated to the distributed ledger network 106 using the mediating member node 112.

Thus, the generation and storing of the instance ID public key 136 (TK) constitutes a write access event for the distributed ledger network 106 by the mediating member 104. As such, the writing of the instance ID public key TK 136 complies with the write access policy 120 of the consortium manager 116. Specifically, for example, the write access enforcer 124 may be configured to verify that the instance ID public key TK 136 is associated with a consortium ID of the mediating member 104, as stored within the CID repository 118, and as validated and verified by a specified number or percentage of remaining consortium members.

The instance ID generated by the instance ID generator for the participant 110 includes a public key/private key pair denoted herein as TK, $TK^-$. This public key/private key pair may thus be understood to represent access tokens that are unique to the participant 110, and that effectively provide an invitation or request to the participant 110, authorizing the participant 110 to accept the offered access and participate in the current, mediated transaction instance. As also referenced, the instance ID private key $TK^-$ 134 is distributed to the participant 110 in a secure, confidential manner, so that it is assumed that only the participant 110 and the mediating member 104 have knowledge of, or access to, the instance ID private key $TK^-$ 134.

The simplified example of FIG. 1 illustrates only the single participant 110. In mediated network transactions, however, many such participants may be included. Consequently, the instance ID generator 132 may be configured to generate a corresponding instance ID (e.g., corresponding public key/private key pair) for each such participant. By way of notation, as used below, the first participant 110 may thus receive an instance ID notated as $TK_1$, $TK_1^{-1}$, while a second such participant may be provided a second instance ID notated as $TK_2$, $TK_2^{-2}$, and so on for any number "n" of participants, $TK_n$, $TK_n^{-1}$.

Thus, for each such instance ID, the transaction application 102 may leverage the consortium manager 116 to execute a consortium-based, authorized write event for each instance identity public key $TK_n$ (e.g., in accordance with the write access policy 120, and using the consortium ID of the mediating member 104). As appreciated from the above, corresponding instance ID private keys $TK_n^{-1}$ may each be securely and confidentially provided to its corresponding unique participant.

The transaction application 102 includes an ID mapper 138, which populates an ID repository 140 in which an actual identity of the participant 110 is mapped to the corresponding instance ID private key $TK_1^{-1}$ 134. Similar comments would apply for all instance participants, so that the ID mapper 138 ultimately constructs the ID repository 140 as including a mapping of each actual identity of each participant with its corresponding instance-specific identity for the network transaction currently being mediated.

Meanwhile, it will be appreciated that the instance ID public key TK 136 of the participant 110, as well as all instance-specific distributed public keys, up to and including a final instance ID public key $TK_n$, are registered with, e.g., stored on, the distributed ledger network 106. Put another way, for example, the distributed ledger network 106 may be understood to store, and make available, an array or list of all of the instance identity public keys $TK_1$ . . . $TK_n$ (or derivatives or variations thereof).

The participant 110 (and other participants) may proceed with executing the network transaction instance, using the transaction application 130. For example, the participant 110 may utilize a participant ID generator 144 to generate participant-specific identity information, such as a separate public key/private key pair, notated herein as participant keys $PK_1$, $PK_1^{-1}$. As shown, the transaction application 130 of the participant 110 also includes a payload generator 146, which may be configured to generate one or more various types of data to be included with a transaction payload of the mediated transaction instance being conducted.

Consequently, as also shown, the participant 110 may submit a signed transaction payload 148 to the surrogate member 108. In this regard, it will be appreciated that the signed transaction payload 148 may be signed using the instance ID private key $TK_1^{-1}$ 134. The signed transaction payload 148 may also be signed using a corresponding participant ID $PK_1^{-1}$, as described in various example implementations, below. For purposes of a remainder of the description of the system 100 of FIG. 1, however, it is assumed for the sake of simplicity that the signed transaction payload 148 is signed using only the instance ID private key $TK_1^{-1}$ 134. Example implementations that further utilize participant keys $PK_1$, $PK_1^{-1}$ are provided below, e.g., with respect to FIGS. 5-7.

At the transaction application 128 of the surrogate member 108, a write request handler 150 may receive the signed transaction payload 148 for potential writing to the surrogate member node 114, and thus to the distributed ledger network 106, on behalf of the participant 110. For example, as shown, an ID verifier 152 may verify and validate a signature of the signed transaction payload 148 (e.g., using the instance ID private key $TK_1^{-1}$ 134) against the corresponding array of instance ID public keys $TK_1$ . . . $TK_n$ previously stored on the distributed ledger network 106 by the mediating member 104.

Upon successful verification, the transaction application 128 may leverage the consortium manager 126 and associated features thereof to register a signed transaction payload 154 to the surrogate member node 114, and thus to the distributed ledger network 106. In other words, the surrogate member 108 utilizes its privileges and capabilities as a consortium member, including use of its own consortium identity, and knowledge of corresponding consortium member identities of remaining consortium members, to execute a write access event in accordance with the write access policy 120.

In so doing, the surrogate member 108 maintains an anonymity of the participant 110 with respect to the signed transaction payload 148. For example, any consortium member accessing the signed transaction payload 154 on the distributed ledger network 106 would observe that the authorized writing of the signed transaction payload 154 was conducted in accordance with the unique consortium member ID of the surrogate member 108, without any explicit or public identification of an actual identity of the participant 110.

At the same time, the mediating member 104 may utilize the transaction application 102 to identify the signed transaction payload 154 as having been signed using the instance ID private key $TK_1^{-1}$ 134 that was previously provided to the participant 110 in a secure, confidential manner. Specifically, the transaction application 102 may utilize the ID mapper 138 to map (using the ID repository 140) the instance ID private key $TK_1^{-1}$ 134 to the stored, actual corresponding identity of the participant 110.

In the example of FIG. 1, as described in detail, below, an initial iteration of the described and illustrated processes may be conducted for the purpose of registering the participant 110 as a participant in the corresponding, unique transaction instance. Subsequent iterations may proceed with submissions of actual transaction data to be included within a corresponding, signed transaction payload of the mediated transaction instance.

Further in FIG. 1, the participant 110 is illustrated as being separate from the consortium and the distributed ledger network 106. This illustration conveys that the surrogate member 108 may operate on behalf of the participant 110 with respect to the distributed ledger network 106 and the mediated transaction instance in question. However, as described in detail below, it may occur that the participant 110 has access to the distributed ledger network 106. In particular, for example, it may occur that the participant 110 is also a member of the consortium. As such, it will be appreciated that the participant 110 may itself act as a surrogate member for another participant of the mediated transaction instance.

Finally with respect to FIG. 1, the mediating member 104 is illustrated as executing at least one computing device 156, which itself includes at least one processor 158, and non-transitory computer readable storage medium 160. As shown, the consortium manager 116 and the transaction application 102 may be implemented using instructions stored using the non-transitory computer readable storage medium 160, as executed by the at least one processor 158. Of course, the non-transitory computer readable storage medium 160 may also be utilized to store data, such as network transaction data stored using the mediating member node 112 and locally to the mediating member 104. Of course, various other hardware and software elements of the at least one computing device 156 may be implemented at the mediating member 104, and similar comments apply with respect to implementations of the surrogate member 108 and the participant 110 (not explicitly illustrated in FIG. 1 for the sake of brevity and clarity).

FIG. 2 is a flowchart 200 illustrating example operations of the system 100 of FIG. 1. In the example of FIG. 2, operations 202-208 are illustrated as separate, sequential operations. In various implementations, additional or alternative operations or sub-operations may be included, and/or one or more operations or sub-operations may be omitted. In these and other implementations, it may occur that any two or more operations or sub-operations may occur in a partially or completely overlapping or parallel manner, or in a nested, iterative, branched, or looped fashion.

In the example of FIG. 2, a mediated transaction instance of a transaction application may be generated, at a mediating member of a set of members of a distributed ledger network for which the set of members have corresponding member identities (202). Further in operation 202, write access to the distributed ledger network is restricted by a write access policy requiring a writing member identity of the member identities to be shared in conjunction with the write event by a writing member. For example, an instance of the transaction application 102 may be generated at the mediating member 104, where, as described above with respect to FIG. 1, the mediating member 104 may represent a member of a consortium utilizing the distributed ledger network 106, including implementing the write access policy 120 at the consortium manager 116 of the mediating member 104. Of course, write access policy 120 may also be enforced by other members of the consortium utilizing the distributed ledger network 106, as described herein by way of example with respect to the surrogate member 108 and the consortium manager 126.

For the mediated transaction instance, an instance identity private key may be generated that is provided to a participant of the mediated transaction instance (204). For example, the instance ID generator 132 may generate the instance ID private key $TK^{-1}$ 134, which may then be distributed to the participant 110 in a secure, confidential manner.

An instance identity public key corresponding to the instance identity private key may be registered with the distributed ledger network, using a mediating member identity of the mediating member in accordance with the write access policy (206). For example, the instance ID generator 132 may further generate the instance identity public key TK 136, and thereafter write the instance identity public key TK 136 to, e.g., the mediating member node 112 of the distributed ledger network 106. As described herein, the write event of registering the instance identity public key TK 136 with the distributed ledger network 106 complies with the write access policy 120, including use of a consortium identity of the mediating member 104, as stored using the CID repository 118, and otherwise in accordance with write operations of the consortium manager 116.

Via the distributed ledger network, a transaction payload may be received from the participant for the mediated transaction instance, the transaction payload being registered on the distributed ledger network for the mediated transaction instance by a surrogate member of the set of members on behalf of the participant, using a surrogate member identity of the surrogate member and in accordance with the write access policy (208). Further in operation 208, the transaction payload may be signed using the instance identity private key, and the surrogate member may authenticate the signed transaction payload against the registered instance identity public key before registering the signed transaction payload on the distributed ledger network. For example, as shown and described with respect to FIG. 1, the participant 110 may generate the signed transaction payload 148, using the instance ID private key $TK^{-1}$ 134 to sign the signed transaction payload 148. The participant 110 submits the signed transaction payload 148 to the surrogate member 108 of the consortium, and the surrogate member 108 is thus provided with the ability to authenticate the signed transaction payload 148 against the previously-registered instance identity public key TK 136 on the distributed ledger network 136.

Once this validation is completed, the surrogate member 108 may proceed to utilize its own consortium identity of the CID repository 118, along with associated write operations of the consortium manager 126 implemented to enforce the write access policy 120, to thereby write the signed transaction payload 154 to the surrogate member node 114 of the distributed ledger network 106. In this way, the participant 110 remains anonymous to the surrogate member 108, even though the surrogate member 108 is assured that the participant 110 is authorized to submit the signed transaction payload 148. Further, the write access privileges of the surrogate member 108 may be leveraged by the participant 110 to register the signed transaction payload 154 on the distributed ledger network 106. In this way, features and advantages of the consortium are effectively leveraged, while maintaining an anonymity of the participant 110 in the context of the transaction instance to all members of the consortium, except for the mediating member 104.

Figure 3:
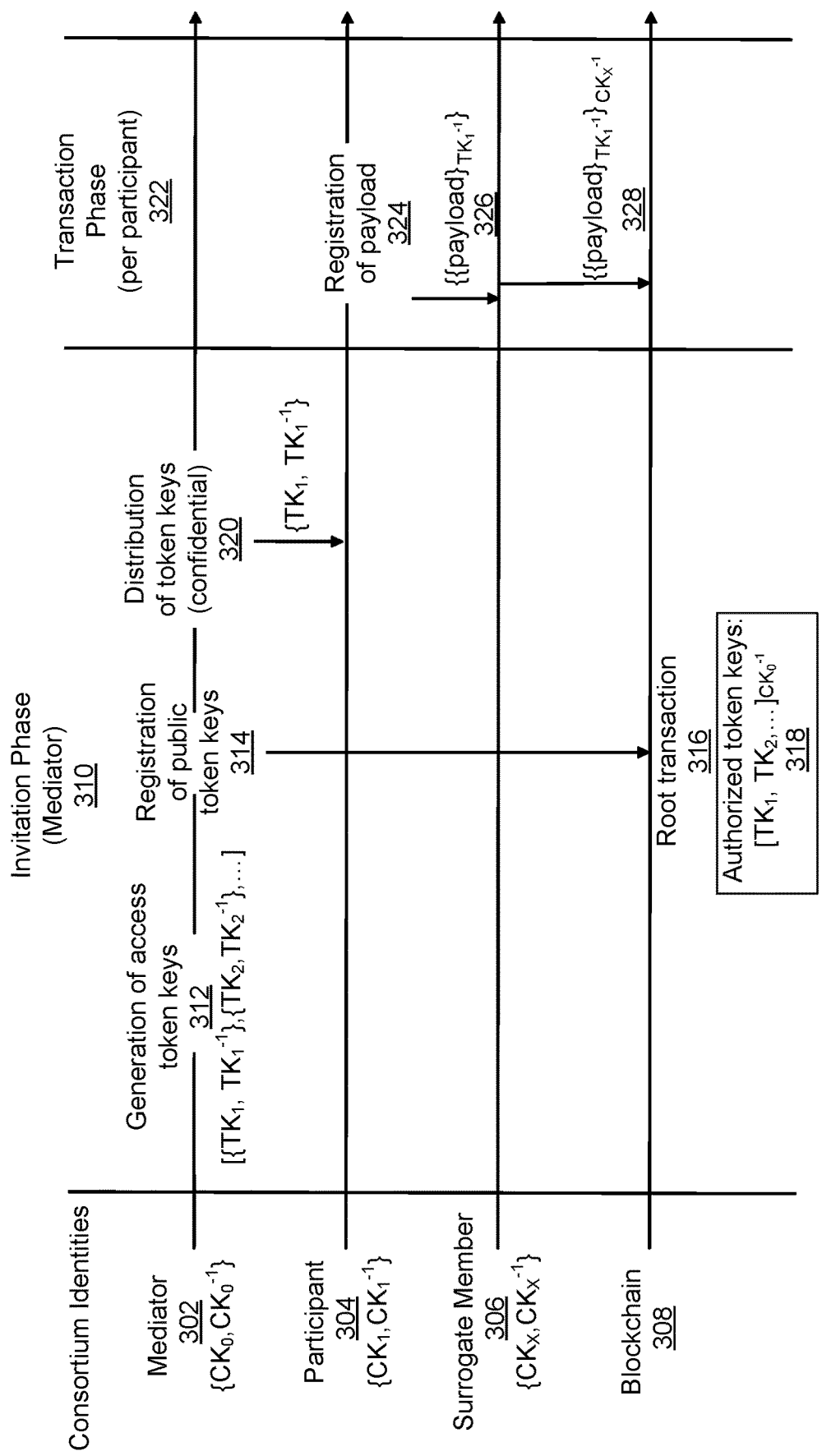
FIG. 3 is a timing diagram illustrating a first example implementation in accordance with FIGS. 1 and 2.

FIG. 3 is a timing diagram illustrating a first example implementation in accordance with FIGS. 1 and 2. In the example of FIG. 3, a mediator 302 represents an example of the mediating member 104 of FIG. 1, and is associated with a corresponding consortium ID that includes a public key $CK_0$, as well as a private key $CK_0^{-1}$. As described, the consortium identity of the mediator 302 may be stored within the CID repository 118, as well as within, or accessible by, the consortium manager 126 and other consortium managers of other consortium members.

Further in the example of FIG. 3, a participant 304 (representing an example of the participant 110 of FIG. 1) is, in the examples, considered to also be a member of the consortium. Consequently, the participant 304 has a consortium identity represented as $\{CK_1, CK_1^{-1}\}$. However, as referenced herein, the participant 304 need not be a member of the consortium, nor have a consortium identity, in order to communicate with a surrogate member and utilize the techniques described herein.

Specifically, a surrogate member 306 represents the surrogate member 108 of FIG. 1. As shown, in the example, the surrogate member 306 has its own consortium identity $\{CK_x, CK_x^{-1}\}$.

A blockchain 308 represents an example of the distributed ledger network 106 of FIG. 1. As already described with respect to FIG. 1, the blockchain 308 is associated with a member node of each member, and stores transactions in a distributed, redundant manner, in which, e.g., each transaction block is appended or added to a preceding block of a specific blockchain transaction.

In FIG. 3, an invitation phase 310 begins when the mediator 302 generates access token keys corresponding to the keys 136, 134 of FIG. 1 (312). Specifically, the transaction application 102 of FIG. 1 may utilize the instance ID generator 132 to generate a plurality of access token pairs for a corresponding plurality of invited participants. That is, FIG. 1 illustrates the single participant 110 being associated with the instance ID private key $TK^{-1}$ 134 and the corresponding instance identity public key $TK$ 136. In practice, a plurality of participants may be invited to participate in the transaction instance in question, so that each of the participants will be associated with a corresponding pair of access token keys $[\{TK_1, TK_1^{-1}\}, \{TK_2, TK_2^{-1}\}, \ldots]$.

Once the plurality of access token keys are generated, the invitation phase 310 may proceed with registration of the public token keys of the access token keys with the blockchain 308 (314). As shown, a root transaction 316 may be conducted with the blockchain 308, to thereby register authorized token keys 318 as $[TK_1, TK_2, \ldots]CK_0^{-1}$.

In other words, because the registration 314 of the public token keys represents a write event by the mediator 302 as a member of the consortium and executed on the blockchain 308, the root transaction 316 is signed with the private key of the consortium ID of the mediator 302, e.g., $CK_0^{-1}$. Consequently, in accordance with the write access policy 120 and associated operations of the consortium manager 116, all parties with authorized access to the blockchain 308 may verify, by virtue of the signature $CK_0^{-1}$, that the root transaction 316 was executed by the mediator 302, and that the authorized token keys 318 were authorized for registration by the mediator 302.

The invitation phase 310 may proceed with a confidential distribution of token keys to corresponding participants (320). As shown in FIG. 3, the participant 304 may thus receive its corresponding access token keys $\{TK_1, TK_1^{-1}\}$, which may be distributed using any suitable, confidential, secure channel. Of course, similar distribution of remaining access token keys may be executed with respect to all remaining participants of the transaction instance in question, so that a second participant will receive the second set of access token keys $\{TK_2, TK_2^{-1}\}$, inviting the second participant to the transaction instance. The process may continue, until the nth participant $\{TK_n, TK_n^{-1}\}$ has had its corresponding public access token $TK_n$ registered on the blockchain 308, and has confidentially received its corresponding private access token $\{TK_n^{-1}\}$.

Following conclusion of the invitation phase 310, a transaction phase 322 may be executed, in which each invited participant may proceed to conduct one or more transactions associated with the transaction instance. As referenced above with respect to FIG. 1, and as described and illustrated below with respect to FIGS. 5-7, a participant's initial transaction may include various registrations on the blockchain 308 associated with acceptance of the invitation of that participant that occurred during the invitation phase 310. In other words, for example, the participant 304 may simply register an acceptance of the invitation of the participant 304 to participate in the transaction instance, in conjunction with the root transaction 316, and without providing any data associated with the actual transaction instance being executed. Additionally, or alternatively, a transaction of the transaction phase 322 may include an actual data payload of the transaction instance being executed.

Thus, the simplified example of FIG. 3 illustrates a generic payload registration 324 in which the participant 304 provides a registration 326 in which any included payload is signed using the previously-received private access token $TK_1^{-1}$, shown as $\{\{payload\}_{TK_1}^{-1}\}$. As already described above with respect to FIG. 1, and as illustrated in the example of FIG. 3, the payload registration 326 may be provided by the participant 304 to the surrogate member 306. For example, the registration payload 326 may be provided anonymously, using, e.g., the techniques described below with respect to FIG. 4, or using other suitable communication channels.

Nonetheless, the surrogate member 306 may be enabled to verify authorization and authenticity of the registration payload 324, by using the signature $TK_1^{-1}$ of the registration payload 324 in conjunction with the root transaction 316 and included authorized token keys 318. In other words, in the example, the surrogate member 306 may verify the signature $TK_1^{-1}$ against the previously-registered public access token corresponding thereto, i.e., $TK_1$.

Thus, the registration payload 324 may be understood to correspond to the signed transaction payload 148 of FIG. 1, provided to the surrogate member 306 in the example of FIG. 3. Consequently, as described above with respect to the surrogate member 108 and corresponding signed transaction payload 154 of FIG. 1, the surrogate member 306 may proceed to use its unique consortium identity $\{CK_X, CK_X^{-1}\}$ to execute a registration/write event of a signed transaction payload 326. Specifically, as shown, the surrogate member 306 signs the validated, authorized registration payload 324 using its private consortium identity $CK_X^{-1}$, to thereby make the signed registration payload 328, shown as $\{\{\text{payload}\}_{TK_1^{-1}}\}_{CK_x^{-1}}$, available on the blockchain 308 and in conjunction with the root transaction 316.

Upon completion of operations of FIG. 3, all transactions of authorized participants, including the participant 304, will be stored on the blockchain 308 in conjunction with the root transaction 316. The stored transactions will be visible to all authorized viewers of the blockchain 308 and the root transaction 316, including the mediator 302, the participant 304 (and other participants), the surrogate member 306, and all of the consortium members. However, the actual identity of each participant, including the participant 304, will be obscured to any such viewer of the blockchain 308, except for the mediator 302. As described, the mediator 302 may simply use the ID mapper 138 of the transaction application 102, in conjunction with the ID repository 140 storing the previously-sent private access tokens.

Figure 4:
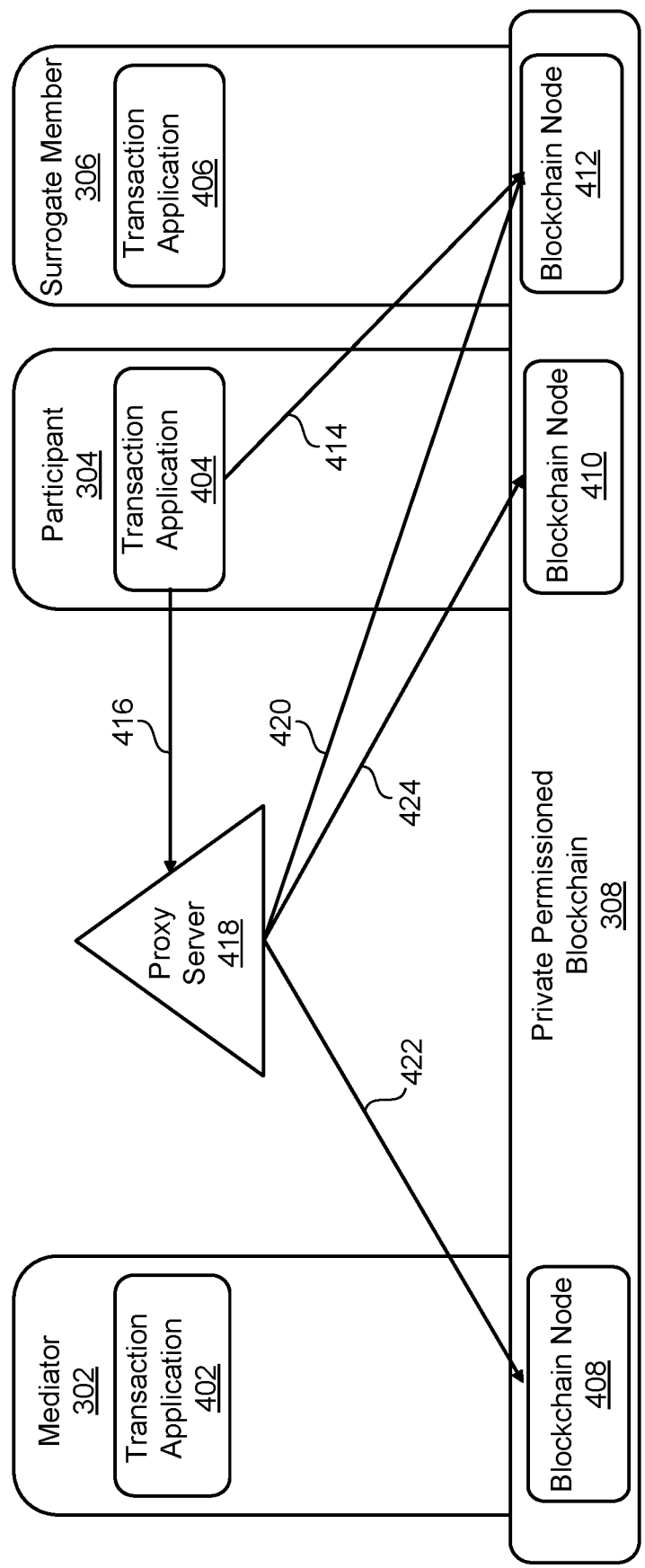
FIG. 4 is a block diagram illustrating example implementations of payload registration techniques of FIGS. 1-3.

FIG. 4 is a block diagram illustrating example implementations of the payload registration techniques described above with respect to FIGS. 1-3. Specifically, as shown, and as may be appreciated from the above description of FIG. 1, the mediator 302 may include a transaction application 402, the participant 304 may include a transaction application 404, and the surrogate member 306 may include a transaction application 406. Further, on the private-permissioned blockchain 308, the mediator 302 may have a corresponding blockchain node 408, while the participant 304 has a blockchain node 410, and the surrogate member 306 has a blockchain node 412.

In order to execute the registration 322 of payloads 324, 326, (corresponding to payloads 148, 154 of FIG. 1), the participant 304 may simply request that the surrogate member 306 utilize the blockchain node 412 of the surrogate member 306, and the transaction application 406, to authorize and write the requested payload to the blockchain 308. In other words, an arrow 414 illustrates that the participant 304 may simply request the surrogate member 306 to execute the desired payload registration.

Although the request corresponding to the arrow 414 may be provided anonymously by the participant 304, it is possible that the surrogate member 306 could illicitly determine or derive an identity of the participant 304 in some circumstances. For example, it may occur that the registration operations described herein occur over a particular period of time, and with respect to a number of participants and associated transactions. In such circumstances, the surrogate member 306 may be able to examine each received request, and, in the aggregate, make determinations regarding identities of the requesting participants. For example, the surrogate member 306 may identify a group of such requests originating from the same or similar IP address.

Consequently, in some implementations, the participant 304 may utilize the transaction application 404 to transmit the desired payload registration request, represented by an arrow 416, to a proxy server 418. In particular, for example, the proxy server 418 may be associated with an independent, anonymous IP address, which may therefore further shield and anonymize an identity of the participant 304. In particular, it will be appreciated that the proxy server 418 may be utilized by some or all of the participants of the transaction instance, including the participant 304, so that all such participants will have an added layer of anonymity during the registration processes described herein.

Thus, as represented by an arrow 420, the proxy server 418 may simply forward the payload registration request represented by the arrow 416 to the blockchain node 412 of the surrogate member 306. In other words, it will be appreciated that the arrows 416, 420 represent essentially the same substance of request as the arrow 414, but provided via the proxy server 418.

Further, it will be appreciated that the surrogate member 306 represents any consortium member that is authorized to view and write to the private-permissioned blockchain 308. It may occur over time, e.g., that the participant 304 has a plurality of payload registration transactions to execute, and/or that a plurality of participants each has one or more such payload transactions. Therefore, it is not necessary that the surrogate member 306 represents a single consortium member responsible for registering all such transactions for all such participants. To the contrary, an additional layer of anonymity and efficiency may be obtained by distributing such transaction requests among all available members of the relevant consortium.

In other words, for example, if the participant 304 has a number of payload transactions to execute, for one or more transaction instances, the participant 304 may send a first such transaction request to the surrogate member 306, as shown by the arrow 414 and/or the arrows 416/420. For a second transaction request, the participant 304 may send corresponding requests to a second, separate consortium member as the surrogate member.

For example, as the mediator 302 is itself a consortium member, and as represented by an arrow 422, the participant 304 may utilize the blockchain node 408 of the mediator 302 to register a transaction request and associated payload. In such cases, then, the mediator 302 would also serve as the relevant surrogate member. Such an approach is feasible as long as the mediator 302 is included/used randomly in the write process(es), so that observers may not identify the mediator 302 as such. The mediator 302 also may take other steps to preserve anonymity, such as issuing faked invitations to itself, in order to obscure the actual number of participants.

Similarly, the participant 304, when also a member of the consortium itself, may utilize its own blockchain node 410 to register a transaction request and associated payload. For example, as shown by an arrow 424, the proxy server 418 may be utilized and configured to forward a corresponding transaction request to the blockchain node 410. In the type of examples just described, it may occur that the relevant transaction request may be identified as having been registered to the blockchain 308 via the blockchain 410 of the participant 304. Nonetheless, such a viewer of the blockchain 308 would have no way to associate the transaction request as having originated from the participant 304, so that the identity of the participant 304 remains anonymous in the context of the transaction instance being executed.

Figure 5:
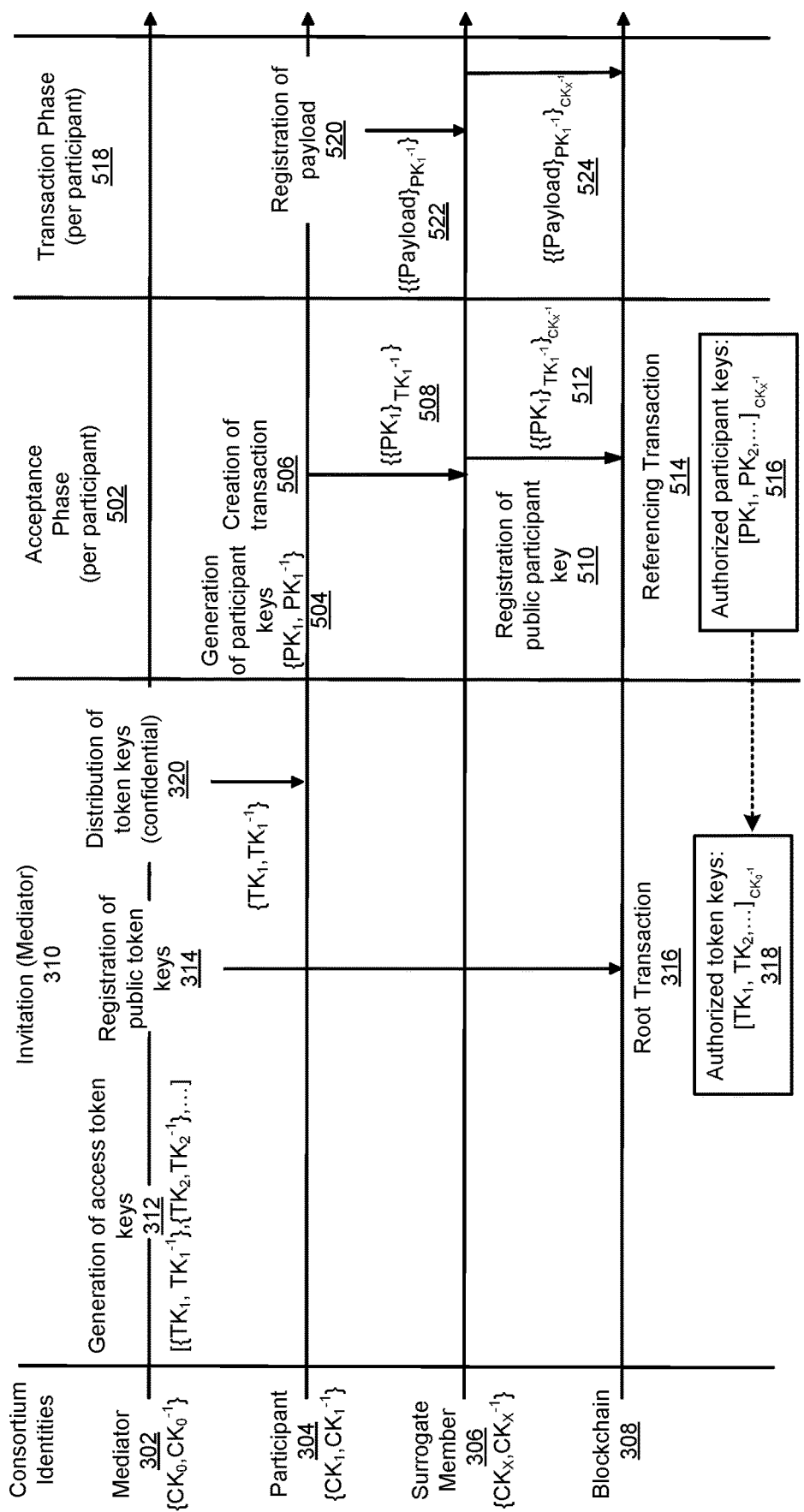
FIG. 5 is a timing diagram illustrating an example extension of the example of FIG. 3.

FIG. 5 is a timing diagram illustrating an example extension of the example of FIG. 3. As FIG. 5 extends the example of FIG. 3, some reference numerals 302-320 are reproduced in FIG. 5, and not described herein in further detail. Moreover, it will be appreciated that FIG. 5 does not illustrate or include use of the proxy server 418 of FIG. 4 for the sake of simplicity, but that the proxy server 418 may be utilized appropriately in corresponding implementations, as would be apparent from the above description of FIG. 4.

As shown, FIG. 5 includes an acceptance phase 502 that follows the invitation phase 310, and is conducted per participant. Thus, with respect to the example of the participant 304, and with further reference back to the participant ID generator 144 of FIG. 1, it may occur that the participant 304 generates participant keys $\{PK_1, PK_1^{-1}\}$ 504. Then, as shown, the participant 304 may initiate a transaction 506 with the surrogate member 306, in which the public participant key $PK_1$ is submitted and signed using the private access token $TK_1^{-1}$. Thus, as shown, the transaction 508 represents an example in which the public participant key $PK_1$ represents the payload of the transaction 324 of FIG. 3.

Then, the surrogate member 306 may proceed to execute a registration 510 of the public participant key $PK_1$, by executing a transaction 512 with the blockchain 308, in which the transaction 508 is signed using the consortium identity $CK_X^{-1}$ of the surrogate member 306. As a result, a referencing transaction 514 is created, in which authorized participant keys 516 reference the root transaction 316 and associated authorized token keys 318.

As the acceptance phase 502 is conducted for each participant, the referencing transaction 514 and authorized participant keys 516 essentially provide a list of (anonymous) participants that have accepted corresponding invitations of the invitation phase 310. In other words, the authorized participant keys 516 may be understood to represent a subset of the authorized token keys 318. For example, it may occur that not all participants invited during the invitation phase 310 have actually accepted any corresponding invitation.

During a subsequent transaction phase 518 that may also occur per participant, the participant 304 may execute a payload registration 520 providing data required for the transaction instance in question. Specifically, as shown, such transaction data is represented by a signed payload 522, in which the data payload is signed using the private participant key $PK_1^{-1}$ of the participant 304 and associated participant keys generated previously during the generation 504.

As already described, this registration may be provided to the surrogate member 306. In the example of FIG. 5, the surrogate member 306 may utilize the referencing transaction 514 and associated authorized participant keys to validate authorization of the signed payload 522. That is, the surrogate member 306 may relate the signature using $PK_1^{-1}$ with the corresponding public participant key $PK_1$.

Having thus verified and validated the signed payload 522, the surrogate member 306 may proceed to register a signed payload 524 with the blockchain 308. That is, as shown, the surrogate member 306 may sign the participant-signed payload 522 using the consortium member identity $CK_X^{-1}$ that is unique to the surrogate member 306.

In FIG. 5 and from the above description, it will be appreciated that the participant private key $PK_1^{-1}$ is known only to the participant. Unlike the token private key $TK_1^{-1}$ that is provided by the mediator 302, the mediator 302 need not be provided with, or have specific knowledge of, the participant private key $PK_1^{-1}$.

Figure 6:
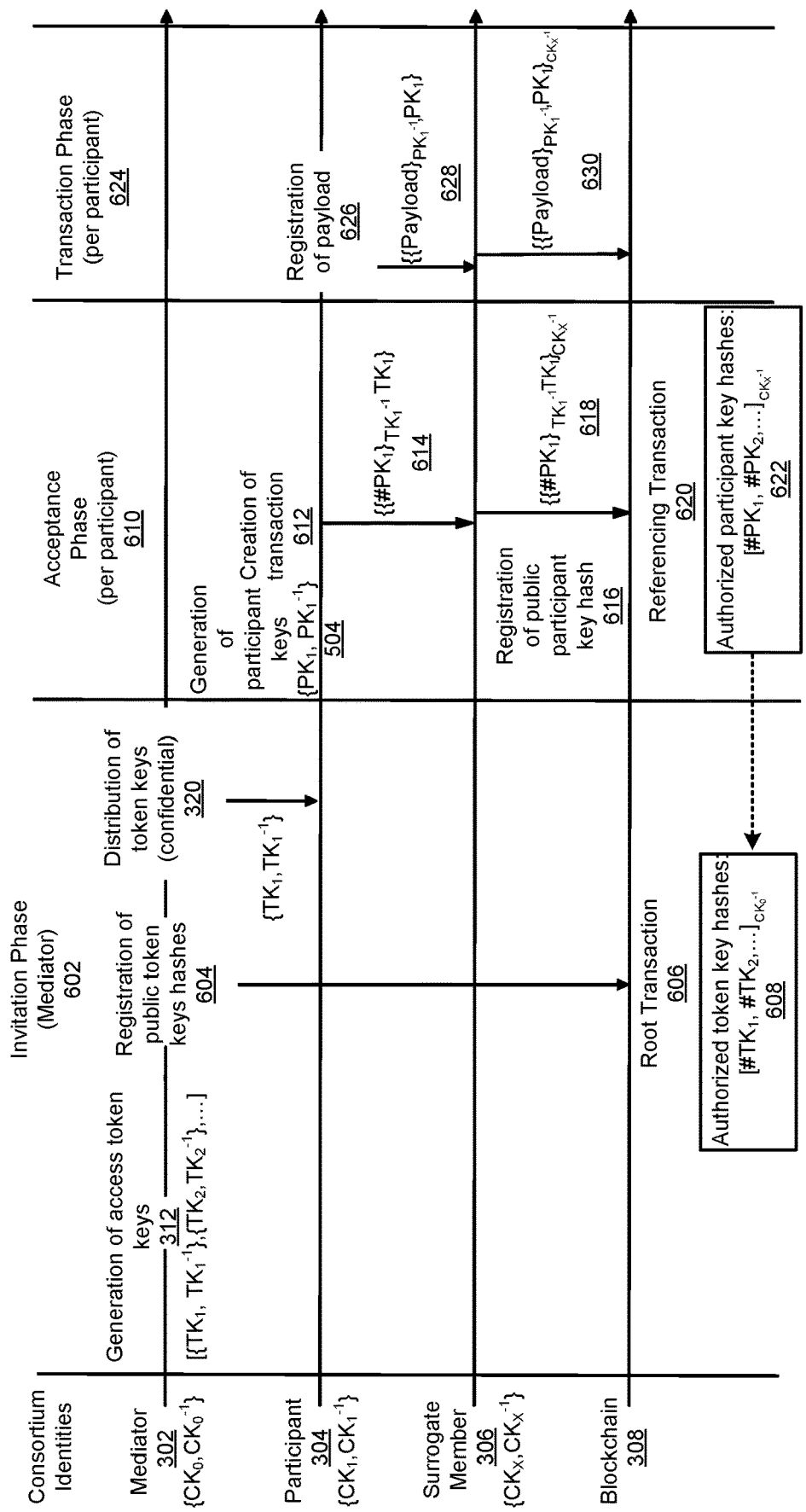
FIG. 6 is a timing diagram illustrating an extension of the example of FIG. 5.

FIG. 6 is a timing diagram illustrating an extension of the example of FIG. 5. As with FIG. 5, portions of FIG. 6 which correspond to FIG. 3, as well as to FIG. 5, are reproduced with identical reference numerals, and are not described herein in further detail with respect to FIG. 6.

For example, in FIG. 6, an invitation phase 602 includes the generation 312 of access token keys. Subsequently, a registration 604 of public token key hashes is executed with the blockchain 308, so that a root transaction 606 is created which includes the registered public key hashes 608, illustrated in FIG. 6 as $[\#TK_1, \#TK_2, \ldots]CK_0^{-1}$. In other words, as compared to FIGS. 3 and 5, instead of registering the public token keys themselves, the root transaction 606 registers hashes thereof, using any appropriate hash generator and associated hashing algorithm. Consequently, in the scenario of FIG. 6, it is not necessary for the mediator 202 to publicly expose the public token keys.

Following the confidential token key distribution 320, an acceptance phase 610 begins with the previously-described participant key generation 504. A transaction creation 612 is executed by the participant 304 with the surrogate member 306. As shown, a resulting transaction 614 includes a hash of the public key $PK_1$, represented in 614 as $\#PK_1$, and signed using the private access token $PK_1^{-1}$ of the participant 304. As further shown, the transaction 614 also includes the public access token $PK_1$ of the participant 304.

The surrogate member 306 may thus proceed to execute a registration 616 of the public participant key #, $\#PK_1$. That is, as shown, the transaction 614 may be signed in its entirety using the private key $CK_X^{-1}$ of the consortium identity of the surrogate member 306. In this way, a referencing transaction 620 may be created and completed as including all authorized participant key hashes 622 for corresponding participants.

In the example of FIG. 6, it will be appreciated that the registration 616 may proceed based on execution of a similar type of validation performed by the surrogate member 306 with respect to the root transaction 606, and as already described above with respect to the root transaction 316 of FIGS. 3 and 5. That is, the surrogate member 306 may validate inclusion of the participant key hashes $PK_1$ by way of the signature thereof, using the private access token $TK_1^{-1}$. In the example of FIG. 6, however, it will be appreciated that the surrogate member 306 may further utilize the included public access token $TK_1$ within the transaction 614 to verify a hash thereof against the authorized token key hashes 608.

Thus, by a conclusion of the acceptance phase 610, each participant that has registered its public participant key hash within the referencing transaction 620 may be validated on the blockchain 308 for subsequent participation in the relevant transaction instance. Consequently, during a transaction phase 624, there's also conducted a participant-by-participant basis, each participant may proceed to submit such payload data for the transaction instance.

Specifically, as shown, the participant 304 may execute a payload registration 626, in which a payload transaction 628 is provided to the surrogate member 306 (e.g., by way of the proxy server 418 of FIG. 4). As shown, the payload transaction 628 may include a data payload that is signed using the private participant key $PK_1^{-1}$ of the participant 304, and provided in conjunction with the public participant key $PK_1$ of the participant 304.

Thereafter, the surrogate member 306 may validate the payload transaction 628 against the authorized participant key hash 622, e.g., by calculating and relating a hash of the participant public key $PK_1$ against the authorized participant key hashes 622.

Finally in FIG. 6, the surrogate member 306 may execute a write event to the blockchain 308 in accordance with the write access policy 120. Specifically, as shown, the surrogate member 306 may utilize its corresponding consortium identity to sign the transaction payload 628 using private consortium key $CK_X^{-1}$, which results in a writing to the blockchain 308. Accordingly, as described herein, the mediator 302 may proceed to match the contents of the payload with an identity of the participant 304, as stored using the ID repository 140 of FIG. 1, and in conjunction with the original private access token key $PK_1^{-1}$ provided to the participant 304 during distribution 320.

Figure 7:
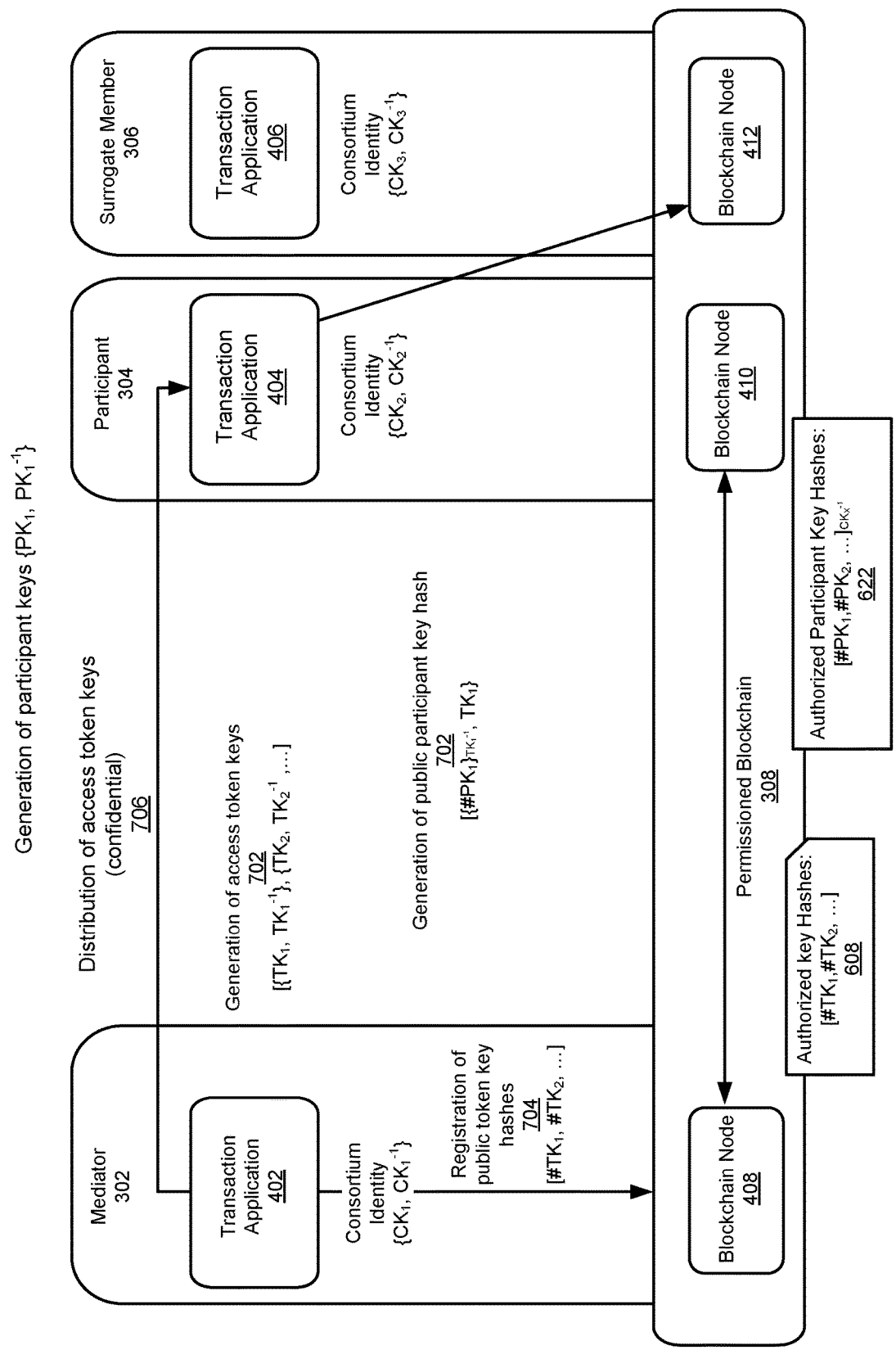
FIG. 7 illustrates an example operational flow associated with an invitation phase 602 and acceptance phase of FIG. 6.

FIG. 7 is a block diagram illustrating an example operational flow 702-712 associated with the invitation phase 602 and the acceptance phase 610 of FIG. 6. As shown, FIG. 7 begins with generation of access token keys (702) by the mediator 302, followed by a registration of public token key hashes of the access token keys at the blockchain node 408 (704). The confidential access token keys made then be distributed (706), e.g., to the participant 304.

Generation of participant keys may then be executed (708) at each participant, e.g., the participant 304. Each participant may then proceed with registration of its public participant key hash (710). For example, as shown, the participant 304 may register its public participant key # at the blockchain node 412 of the surrogate member 306 (e.g., by way of the proxy server 418).

Finally in FIG. 7, verification of each public participant key hash may be executed within an application layer of the transaction application 402/404/406 (712). In other words, as described herein, the verification (712) may be executed with respect to the specific transaction instance of the transaction application 402/404/406 being executed, and separately or independently of the various consortium identities of the mediator 302, participant 304, and surrogate member 306 that may be used to write data to the permissioned blockchain 308.

In one example implementation use case, a secure bidding/procurement process may be implemented, in which a buyer acts as the mediating member (e.g., member 104 of FIG. 1), and participants (e.g., participant 110 of FIG. 1) act as potential suppliers wishing to submit bids/quotes/requests in an anonymous fashion. In these and similar scenarios, the transaction application may be implemented as a smart contract type of application. Further, using the techniques described herein, the buying party may know all identities of all suppliers, yet none of the suppliers will know who any of the other suppliers are. Thus, anonymity is achieved, even in a system that relies on identity knowledge to validate write transactions.

Thus, in the present description, a decentralized solution is provided for mediated anonymity. Participants may avoid (bypass) using a mediator to execute write submissions on the types of permissioned, distributed-ledger networks described herein, while still enabling the mediator to perform its mediation functions. Further, each participant is enabled to use any of the available nodes of the network to verify whether a given transaction of that participant has been added to the ledger.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

generate a mediated transaction instance of a transaction application, at a mediating member of a set of members of a distributed ledger network for which the set of members have corresponding member identities, wherein write access to the distributed ledger network is restricted by a write access policy requiring a writing member identity of the member identities to be shared in conjunction with a write event by a writing member;

generate, for the mediated transaction instance, an instance identity private key that is provided to a participant of the mediated transaction instance;

register an instance identity public key corresponding to the instance identity private key with the distributed ledger network, using the mediating member identity of the mediating member in accordance with the write access policy; and receive, via the distributed ledger network, a transaction payload from the participant for the mediated transaction instance, the transaction payload being registered on the distributed ledger network for the mediated transaction instance by a surrogate member of the set of members on behalf of the participant, using a surrogate member identity of the surrogate member and in accordance with the write access policy, wherein the transaction payload is signed using the instance identity private key, and the surrogate member authenticates the signed transaction payload against the registered instance identity public key before registering the signed transaction payload on the distributed ledger network.

2. The computer program product of claim 1, wherein the instance identity private key is provided to the participant of the mediated transaction instance confidentially and securely with respect to any other participants of the mediated transaction instance, and with respect to other members of the set of members.

3. The computer program product of claim 1, wherein the surrogate member receives the signed transaction payload from the participant anonymously.

4. The computer program product of claim 1, wherein the instructions, when executed, are further configured to cause the at least one computing device to:

register a hash of the instance identity public key corresponding to the instance identity private key with the distributed ledger network, and the surrogate member authenticates the signed transaction payload against the registered hash of the instance identity public key before registering the signed transaction payload on the distributed ledger network.

5. The computer program product of claim 1, wherein the instance identity private key provides an invitation to the participant, and the transaction payload includes an acceptance of the invitation.

6. The computer program product of claim 1, wherein the transaction payload includes a public key of a participant key pair generated by the participant for inclusion in a list of public participants anonymously identifying participants in the mediated transaction instance, the list of public participants referencing a list identifying instance identity public keys that includes the instance identity public key.

7. The computer program product of claim 6, wherein the transaction payload includes a hash of the public key of the participant key pair, and the list of public participants includes the hash among a plurality of hashes of public participant keys, and further wherein the list identifying instance identity public keys includes hashes of the instance identity public keys.

8. The computer program product of claim 1, wherein the distributed ledger network includes a blockchain network.

9. The computer program product of claim 1, wherein the participant provides the transaction payload to the surrogate member via a proxy server.

10. The computer program product of claim 1, wherein the participant is a member of the set of members.

11. A computer-implemented method, comprising:

generating a mediated transaction instance of a transaction application, at a mediating member of a set of members of a distributed ledger network for which the set of members have corresponding member identities, wherein write access to the distributed ledger network is restricted by a write access policy requiring a writing member identity of the member identities to be shared in conjunction with a write event by a writing member;

generating, for the mediated transaction instance, an instance identity private key that is provided to a participant of the mediated transaction instance;

registering an instance identity public key corresponding to the instance identity private key with the distributed ledger network, using the mediating member identity of the mediating member in accordance with the write access policy; and receiving, via the distributed ledger network, a transaction payload from the participant for the mediated transaction instance, the transaction payload being registered on the distributed ledger network for the mediated transaction instance by a surrogate member of the set of members on behalf of the participant, using a surrogate member identity of the surrogate member and in accordance with the write access policy, wherein the transaction payload is signed using the instance identity private key, and the surrogate member authenticates the signed transaction payload against the registered instance identity public key before registering the signed transaction payload on the distributed ledger network.

12. The computer-implemented method of claim 11, wherein the instance identity private key is provided to the participant of the mediated transaction instance confidentially and securely with respect to any other participants of the mediated transaction instance, and with respect to other members of the set of members.

13. The computer-implemented method of claim 11, wherein the surrogate member receives the signed transaction payload from the participant anonymously.

14. The computer-implemented method of claim 11, wherein the instance identity private key provides an invitation to the participant to participate in the mediated transaction instance, and the transaction payload includes an acceptance of the invitation.

15. The computer-implemented method of claim 11, wherein the distributed ledger network includes a blockchain network.

16. The computer-implemented method of claim 11, wherein the participant provides the transaction payload to the surrogate member via a proxy server.

17. The computer-implemented method of claim 11, wherein the participant is a member of the set of members.

18. A computer program product, the computer program product being tangibly embodied on a non-transitory computer-readable storage medium and comprising instructions that, when executed, are configured to cause at least one computing device to:

generate a mediated transaction instance of a transaction application, at a mediating member of a set of members of a distributed ledger network for which the set of members have corresponding member identities, wherein write access to the distributed ledger network is restricted by a write access policy requiring a writing member identity of the member identities to be shared in conjunction with a write event by a writing member;

generate, for the mediated transaction instance, an instance identity private key that is provided to a participant of the mediated transaction instance;

store an identity of the participant, mapped to the instance identity private key;

register an instance identity public key corresponding to the instance identity private key with the distributed ledger network;

receive, via the distributed ledger network, a transaction payload from the participant for the mediated transaction instance, the transaction payload being registered on the distributed ledger network for the mediated transaction instance by a surrogate member of the set of members on behalf of the participant, using a surrogate member identity of the surrogate member and in accordance with the write access policy; and determine the identity of the participant, based on the mapping thereof to the instance identity private key.

19. The computer program product of claim 18, wherein the instructions, when executed by the at least one computing device, are further configured to cause the at least one computing device to:

register the instance identity public key, using the mediating member identity of the mediating member in accordance with the write access policy.

20. The computer program product of claim 18, wherein the transaction payload is signed using the instance identity private key, and the surrogate member authenticates the signed transaction payload against the registered instance identity public key before registering the signed transaction payload on the distributed ledger network.

* * * * *